Oct. 28, 1969     E. WAHLMANN     3,475,016
SPRING FRAMEWORKS

Filed Oct. 24, 1967     2 Sheets-Sheet 1

INVENTOR
ERNST WAHLMANN
BY
ATTORNEYS

Oct. 28, 1969   E. WAHLMANN   3,475,016
SPRING FRAMEWORKS

Filed Oct. 24, 1967   2 Sheets-Sheet 2

INVENTOR
ERNST WAHLMANN
BY
ATTORNEYS

United States Patent Office 3,475,016
Patented Oct. 28, 1969

3,475,016
SPRING FRAMEWORKS
Ernst Wahlmann, Stadthagen, Germany, assignor to P. A. Rentrop G.m.b.H., Stadthagen, Germany, a German Company
Filed Oct. 24, 1967, Ser. No. 677,688
Claims priority, application Germany, Oct. 28, 1966, R 44,475
Int. Cl. A47c 23/30; F16f 3/00
U.S. Cl. 267—87                    10 Claims

ABSTRACT OF THE DISCLOSURE

A spring framework including upper and lower frames and helical springs extending between the frames. The upper ends of the helical springs are linked with transverse flat springs which extend across the framework. The stiffness is variable by adjusting the angle of the linkage between the flat and helical springs.

---

This invention relates to a spring framework for upholstery purposes, for example for armchairs, sofas, automotive vehicle seats and the like.

Spring cores having conical, double-conical or cylindrical helical springs, and furthermore spring cores having flat springs whose ends are declinate in a V-shape have been proposed in various forms. Suspensions in a combination of helical springs and flat springs have also been proposed.

Without exception the helical springs employed in these previously proposed spring cores have only left-hand helices; accordingly, in the upholstered state the spring cores tend to become distorted to the right when loaded. More especially in the case of the front single seats on automotive vehicles this is exceedingly undesirable. Moreover, this construction allows only limited possibilities of designing the top frame of the spring cores larger without additional attachment parts than the bottom frame. This last point is, however, by virtue of the floor proportions in the case of automotive vehicles an imperative necessity in many instances, and it must then be taken as a disadvantage that the top frame outer edge formed by the attachment parts is softer, i.e. more flexible than the top frame inner edge supported and clamped on to the helical springs.

Spring cores having alternately left-handed and right-handed helical springs have also been proposed previously.

Even with flat springs declinate in a V-shape on the ends, spring cores having widely overhanging top frames cannot be manufactured with satisfactory suspension properties, because the upper frame edges of the spring core tilt too easily downwards as a result of the necessary increased length of the upper V-arm. As a rule a combination is then chosen of helical springs as conical as possible for the spring core edges and flat springs for the seating area, whereby the flat springs lie on the upper terminal coils of the helical springs and are clamped on to these with the top frame of the spring core. This then has of course the disadvantage that the hardest point of the suspension, which ought to be at the side and in the case of the seat at the back or in the case of a backrest at the bottom, advantageously at the outer edges of the spring cores, is undesirably shifted into the internal area of the suspension by the extent of the upper coil diameter of the helical springs standing on the lateral edges of the spring core.

The object of the invention is to provide a spring framework for upholstery purposes which ensures elasticity over the entire region of the upholstery, is cheap to manufacture and simple to construct and install. According to the present invention there is provided in a spring upholstery framework a lower frame, an upper frame, and springs supported on the lower frame, the improvement comprising a plurality of generally flat springs, first spring links extending transversely outwardly of the longitudinal direction of the spring framework at each end of each said flat spring, a plurality of helical springs forming said springs supported on the lower frame and each having an upper and a lower end and second spring links extending transversely outwardly of the longitudinal direction of the spring framework from the upper end of each of said helical springs, said first and second links of associated flat and helical springs being interconnected and being secured to said upper frame substantially at said interconnection, and the said first links lying outside the projected contour of the helical springs so that relative movement of the helical and flat springs are independent.

Advantageously the links of the helical springs are inclined to the vertical. In a further development in accordance with the invention, the helical springs lying nearest to the two longitudinal edges of the spring framework are alternately left-handed and right-handed.

In accordance with a further feature the helical springs opposed to each other have a different hand.

The helical springs are supported by their entire terminal coil against the bottom frame, to which they are firmly connected.

In the case of one arrangement in accordance with the invention, the elasticity of the spring framework in the edge region can be varied by varying the spacing between the centre of the helical spring and the top frame, by varying the angle between the link of the respective helical spring and the vertical, and by transferring the transition point between the end of the helical spring and the associated link. The possibility thereby exists of adapting the elasticity or spring temper in the edge region to particular requirements.

By means of the construction in accordance with the invention, the entire width of the upholstery can be used for the spring suspension, because the flat springs are independent in their movements from the associated helical springs. Because of the confined spatial proportions this advantage is in particular of exceptional significance in the case of automotive vehicle seats. The spring framework in accordance with the invention is, in addition, cheap to manufacture and simple to construct as well as to install. Since the terminal coil of each helical spring fastened on the supporting bottom frame of the spring framework comes to an end without any gradient, i.e. is flat, all the helical springs always stand vertically on the bottom frame. When the suspension is loaded this particular position holds good, whereby the undesirable distortion of the spring cores is substantially certainly obviated.

Certain embodiments of spring framework in accordance with the invention are given hereinunder with reference to the accompanying diagrammatic drawings, in which.

Figure 1:
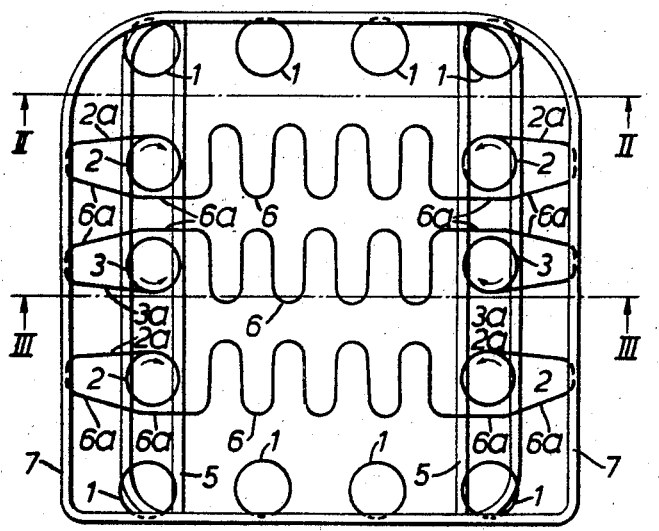
FIG. 1 is a top plan view of a first embodiment of the spring framework.

Helical springs which are located in the front and rear part of the spring framework in accordance with the invention are denoted by 1 (FIG. 1). On the other hand, the reference numerals 2 and 3 indicate helical springs which lie nearest to the two longitudinal edges of the spring framework and are located between the front and rear part of the spring framework. These helical springs 2 and 3 are secured by their one end against the bottom frame 5.

A part of each of these helical springs 1 to 3, namely the helical springs 2 and 3, is formed by the ends of flat springs 6 which lie transversely to the longitudinal direction of the spring framework and which are of various shapes. Each end of the flat springs 6 is thereby formed as a link 6a extending transversely outwardly, so that the flat formation of the flat springs 6 is given merely in the central region of the spring framework. These links 6a can be rectilinear or else be composed of rectilinear parts. The embodiment of FIG. 1, shows a link 6a composed of rectilinear parts.

Figure 3:
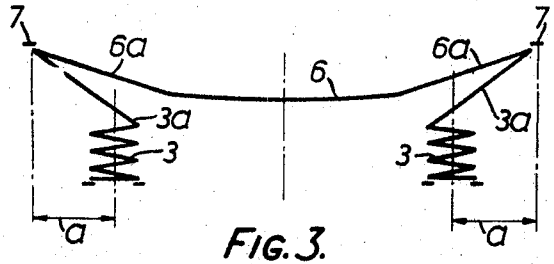
FIG. 3 is a section on the line III—III of FIG. 1.
Figure 4:
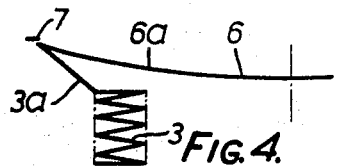
FIG. 4 is a section on the line IV—IV of FIG. 5.

The end of the associated helical springs 2, 3 extending towards the respective flat spring 6 merges into a link 2a, 3a extending obliquely outwards. In accordance with one advantageous embodiment of the invention the links 2a, 3a of the helical springs 2, 3 are inclined to the vertical (see for instance FIG. 3).

The links 6a and 2a or 3a respectively merge into each other and are firmly connected in a suitable manner, for instance clamped to the top frame 7 at the transition point. In accordance with one feature of this embodiment the projection of the link 6a of the flat springs 6 lies outside the contour of the associated helical spring, for example 2 (FIG. 1), so that the helical springs 2, 3 are independent in their movements of the flat springs 6. Departing from the conventional construction there thus exists no connection of any sort between the upper coil of the helical springs 2 or 3 respectively and the flat springs 6 in the coil region. The elasticity of the spring framework over its full width is thereby ensured.

As is evident by way of example from FIG. 1 of the drawings, the helical springs 2, 3 lying nearest to the two longitudinal edges of the spring framework are alternately left-handed and right-handed. Any "swimming" of the spring framework upon being loaded is thereby prevented.

The helical springs 2 or 3 respectively opposed to each other in the transverse direction of the spring framework have a different hand. Thus, by way of example, the helical springs 2 lying to the left in the second row in FIG. 1 is right-handed, whilst the helical spring 2 lying to the right in this row is left-handed.

Figure 2:
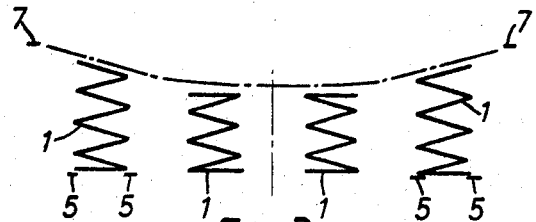
FIG. 2 is a section on the line II—II of FIG. 1.

The helical springs 2, 3 are supported by their entire terminal coil against the bottom frame 5 (see for example FIG. 2) to which they are firmly connected.

Figure 5:
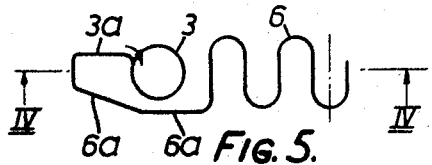
FIGS. 5 to 7 are partial top plan views of several embodiments of flat springs of the spring framework.
Figure 6:
Figure 7:
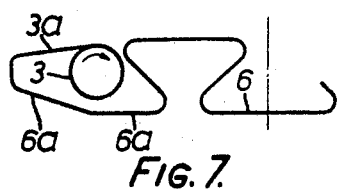

The elasticity of the spring framework in the edge region can be varied by varying the distance $a$ between the centre of the helical springs 2, 3 and the top frame 7. The smaller this gap $a$ is, the more rigid the spring framework becomes. The same effect can, however, also be achieved by varying the angle between the links 2a, 3a of the respective heilcal springs 2, 3 and the vertical. Finally, the elasticity of the spring framework can also be varied by transferring the transition point between helical springs 2, 3 and the associated links 2a, 3a (for example FIG. 5).

FIGS. 5 to 7 and FIG. 11 show modified embodiments of the flat springs 6.

Figure 8:
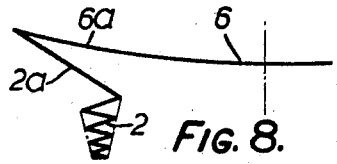
FIGS. 8 to 11 are sections or partial sections of various further embodiments of the spring framework.
Figure 9:
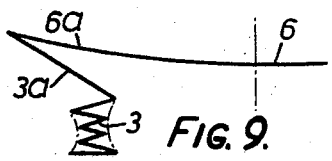
Figure 10:
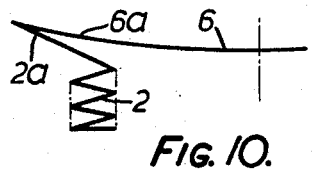
Figure 11:
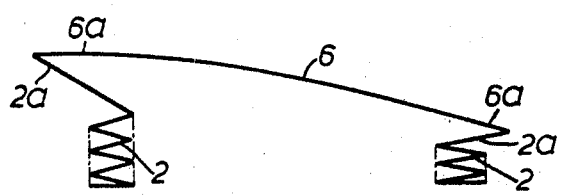

On the other hand, FIGS. 8 to 10 show different embodiments of helical springs, namely conical, double-conical and cylindrical helical springs.

I claim:
1. In a spring upholstery framework,
 a lower frame,
 an upper frame, and
 springs supported on the lower frame, the improvement comprising a plurality of generally flat springs,
 first spring links extending transversely outwardly of the longitudinal direction of the spring framework at each end of each said flat spring,
 a plurality of helical springs forming said springs supported on the lower frame and each having an upper end and a lower end, and
 second spring links extending transversely outwardly of the longitudinal direction of the spring framework from the upper end of each of said helical springs,
 said first and second links of associated flat and helical springs being interconnected and being secured to said upper frame substantially at said interconnection, and
 the said first links lying outside the projected contour of the helical springs so that relative movement of the helical and flat springs are independent.

2. A spring framework according to claim 1, wherein said second links are inclined to the vertical.

3. A spring framework according to claim 1, wherein alternate said helical springs are right-handed and left-handed.

4. A spring framework according to claim 1, wherein opposed said helical springs on the lower frame are of opposite hand.

5. A spring framework according to claim 1, wherein each said helical spring is secured over substantially the whole of its lowermost turn to said lower frame.

6. A spring framework according to claim 1, comprising means for adjusting the stiffness of the edge portion of the framework by varying the distances between the axes of the helical springs and the upper frame.

7. A spring framework according to claim 2, comprising means for varying the angle of inclination of the second links to the vertical.

8. A spring framework according to claim 1, wherein the stiffness of the edge portion of the framework is adjustable by varying the transition point between the end of each helical spring and the corresponding second link.

9. A spring framework according to claim 1, wherein each said helical spring has a radius which varies along its length.

10. A spring framework according to claim 1, wherein each flat spring is of undulate form.

References Cited

FOREIGN PATENTS 754,671   6/1952   Germany.

ARTHUR L. LA POINT, Primary Examiner

U.S. Cl. X.R.

267—102